April 14, 1959     C. F. WHITAKER     2,881,567
FINISHING MACHINE Filed Oct. 18, 1955     9 Sheets-Sheet 1

Fig. 1

INVENTOR
CARL F. WHITAKER
BY KENWAY, JENNEY, WITTER & HILDRETH

ATTORNEYS

April 14, 1959    C. F. WHITAKER    2,881,567
FINISHING MACHINE

Filed Oct. 18, 1955      9 Sheets-Sheet 5

INVENTOR
CARL F. WHITAKER
BY KENWAY, JENNEY, WITTER & HILDRETH
ATTORNEYS

April 14, 1959  C. F. WHITAKER  2,881,567
FINISHING MACHINE

Filed Oct. 18, 1955                                       9 Sheets-Sheet 8

INVENTOR
CARL F. WHITAKER
BY KENWAY, JENNEY, WITTER & HILDRETH

ATTORNEYS

Fig. 18

United States Patent Office 2,881,567
Patented Apr. 14, 1959

2,881,567

FINISHING MACHINE

Carl F. Whitaker, Beverly, Mass.

Application October 18, 1955, Serial No. 541,153

9 Claims. (Cl. 51—5)

This invention relates to a machine for operating on the peripheral surface, of a predetermined part of such surface, of an article having a regular or irregular geometric shape, and as illustrative of its utility the invention is herein shown as a machine for scouring, brushing, burnishing, grinding, sanding, inking and/or buffing or otherwise finishing the peripheral surfaces of heels.

Due to the irregular shape and curvature of such articles as molded rubber, plastic, leather and leather board heels it has heretofore been necessary to finish them by hand and consequently the production per man hour is relatively low and the cost correspondingly high. Hand finishing operations, even when performed by a skilled operator, presents several problems since it is quite difficult to apply the correct pressure against the peripheral surfaces to achieve symmetry and avoid gouging. This difficulty is also encountered in operating on various other articles particularly those of irregular geometric shape.

The principal objects of the present invention are to provide an efficient and reliable machine for automatically operating on the peripheral or outer surface of an article, or a selected portion of such surface, for a predetermined period of time, to provide a machine which uniformly operates on the surface of such article without danger of injuring it, and to provide a machine which can be operated by an unskilled person without danger of injuring the machine or the operator.

A more specific object is to provide an efficient and reliable machine for automatically scouring or sanding, coloring, and/or buffing the peripheral surface of a molded leather board heel and the like articles so as to insure symmetry, avoiding gouging, and eliminate the manual labor now involved in finishing such heels.

Further objects relate to various features of construction and will be apparent from a consideration of the following description and the accompanying drawings wherein.

In accordance with the present invention I provide a machine comprising one or more carriers each of which is provided with a rotatable and releasable holder, gripper or other suitable means for holding the article to be operated on. Each carrier is supported so as to be successively moved from a loading station, at which the articles to be operated on are fed or applied to the holders, then to one or more operating stations where such articles are operated on, and finally back to the loading station by which time the holders have been actuated so that the articles operated on may be removed or ejected.

As each carrier comes to or approaches an operating station, the holder is rotated so as to present to the operating instrumentality the whole or a selected part of its peripheral surface and after a predetermined period of operation the carrier leaves the station and travels to the next station. The nature of the operations performed on the article are many and varied, depending upon the particular article. In the case of molded heels, they may first be scoured or sanded, and/or painted, waxed, lacquered, brushed or buffed. Articles of metal, plastic, wood and the like materials may also receive similar treatment so as not only to remove burrs, mold marks and other irregularities, but also to polish or otherwise finish them.

Regardless of the particular type of article to be operated on, provision is made for bringing the articles into operative position with the operating instrumentality and to this end each carrier is provided with a leader cam or the like operative to effect the relative movement between the rotating holder and the operating instrumentality so that the latter engages the peripheral surface, or a predetermined part thereof, governed by the shape of the leader cam. For example, in operating upon a heel, if it be desired to scour the entire peripheral surface including the breast area, then the leader cam would have the shape of the finished heel; but if, as is usual, the breast surface is not to be scoured then the leader cam would be provided with a throw or protuberance operative to effect relative movement of the carrier away from the sander during that period when the breast surface would otherwise be in contact with the sander. The same operating principle is applicable to various articles since the shape of the leader cam governs the area to be operated on.

The time or period of operation is governed by the dwell of the carrier at the operating station and to this end any of the numerous mechanical devices may be employed. Where a plurality of circumferentially spaced, symmetrically disposed carriers are supported to provide a battery revolving on a fixed axis, a Geneva mechanism with a double driving arm or pin is most satisfactory.

The operating pressure exerted by the sanding wheel, buffing wheel or other instrumentality may not only be controlled by the leader cam, but also by adjusting the position of such instrumentality relative to the path of travel of the carrier. It is therefore advantageous to mount the sanding or buffing wheel or other instrumentality so as to pivot toward and away from the path of travel of the carrier and employ a set screw or the like to maintain the precise angular position desired.

An important feature of the invention is the provision of a carrier having compensating means for backlash and wear. Such means comprises a shaft one part of which rotatably supports the holder and another part rotatably supports the leader cam and being angularly adjustable relative to the first part so that an article carried by the holder is always correctly presented to the operating instrumentality, thus overcoming inaccuracies which would otherwise occur.

In sanding, buffing and the like operations where the active surface is apt to wear or become foul, it is necessary to replace it periodically and in order to reduce the number of replacements I provide an axially adjustable sanding wheel having an active surface at least twice as wide as the surface to be operated on, the wheel being so set that only a part of its circumferential surface is used until worn, after which the wheel is moved axially to present a fresh circumferential surface, thus avoiding the necessity of making replacements every time a circumferential area wears out or becomes fouled.

A further feature of the invention is in fine sanding and light buffing operations which require a light resilient pressure in order to achieve the smooth finish desired. I accomplish this by providing my sanding or buffing wheel with a strip of abrasive or other material which, due to centrifugal action, is held slightly spaced from the peripheral surface of the wheel so as to provide, in effect, an air cushion which gives the desired resiliency.

Another feature of the invention is the provision of a drive which automatically cuts out in event the machine jams or becomes overloaded. To this end, the driving motor and associated parts are carried on a pivotally mounted bracket which may be spring balanced so that excessive driving tension tends to swing the bracket in a direction to loosen the driving belt or chain sufficiently to cause slippage. If desired, the pivotal bracket may be connected with a cutout switch and/or signal notifying the operator of the trouble.

Referring to the accompanying drawings, the numeral 1 designates a frame having upright members 2, 3, 4 and 5 (Figs. 1 to 3), cross members 6 and 7, four longitudinal members 8 and 9, and a platen 10 on which is mounted a battery carrying four carriers 12 (Figs. 1 and 4) and a drive mechanism 14 (Figs. 2 and 6) for intermittently advancing each of the carriers 12 from a loading station L (Figs. 3 and 5), where premolded heels H are inserted in the carrier holders, to a first operating station O-1, where a coarse sanding mechanism operates on the peripheral surface of each heel, then to a second operating station O-2, where a fine sanding mechanism operates on the heel, next to an unloading or discharge station D, where the scoured heels are released from the grip of the carriers and discharged into a chute 18 in the platen 10, and finally back to the loading station. Since each of the carriers 12 and their associated operating mechanisms are identical, the following description will be confined to a single carrier with the understanding that the description is applicable to all.

*The carrier battery*

Figure 4:
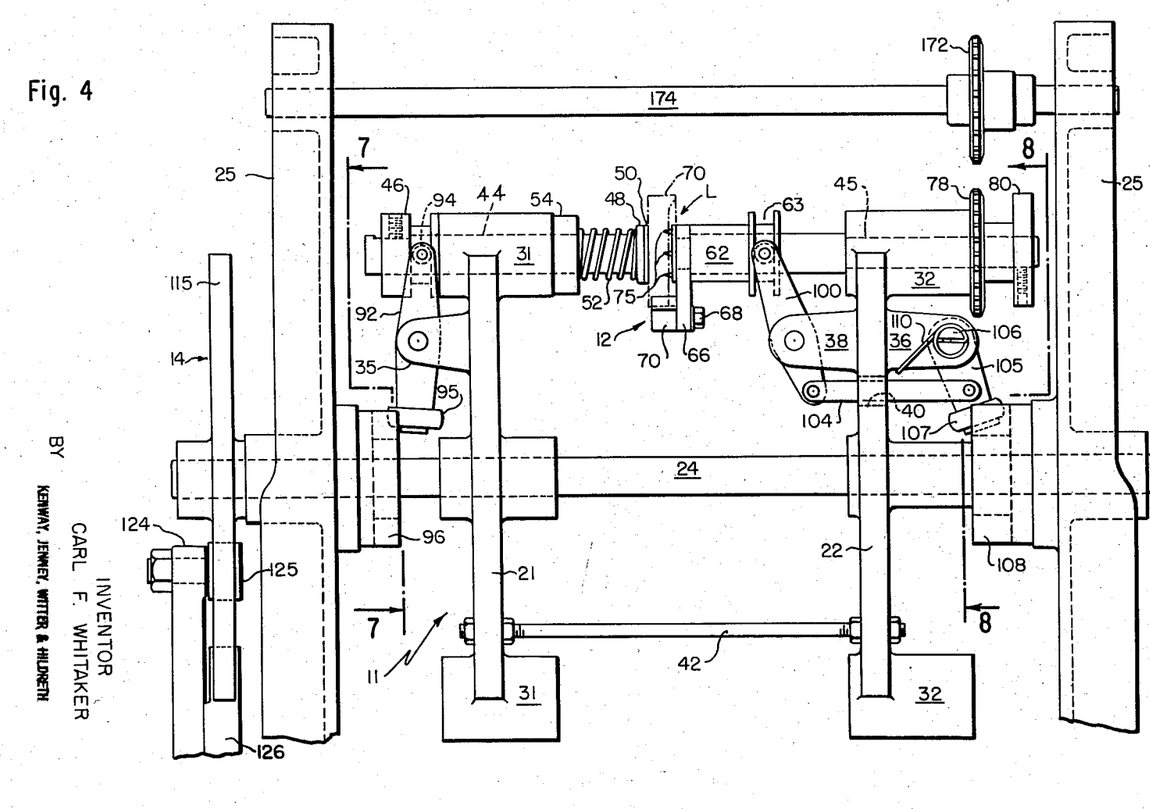
Fig. 4 is an enlarged elevation viewed from the front with parts removed for greater clarity.

The battery comprises a pair of spaced plates or wheels 21 and 22 (Figs. 4, 7 and 8) mounted on a main battery shaft 24 journaled in bearings carried by the bearing stands 25 which are rigidly secured to the platen 10. The wheel 21 is formed with four bearings 31 spaced 90° apart and aligned with four bearings 32 in wheel 22. Spaced inwardly of each bearing 31 is a pair of outwardly extending ears 35 (Figs. 4 and 7), and spaced inwardly of each bearing 32 of the wheel 22 is a pair of outwardly extending ears 36 and a pair of inwardly extending ears 38 aligned with the ears 36, as best shown in Fig. 4. Inwardly of each pair of aligned ears is an opening 40 (Figs. 5 and 8) extending through the wheel 22. Tie rods 42 (Figs. 4 and 5), interposed between each pair of bearings 31 and 32, insure the desired degree of rigidity.

Referring to Figs. 4 and 7 to 9, each carrier 12 comprises a pair of axially aligned shafts 44 and 45 rotatable in bearings 31 and 32, respectively. The outer end of the shaft 44 carries a spool 46 and its inner end carries a steel disk 48 to which is secured a rubber pad 50 or the like resilient member constituting one of a pair of releasable clutching jaws or grippers. A compression spring 52, circumposed about the inner end of the shaft 44, acts against the disk 48 and a thrust bearing 54 disposed against the inner face of the bearing 31, the construction and arrangement of parts being such that the spring 52 normally holds the shaft 44 and associated parts in advanced position, as shown in Fig. 4.

Figures 9, 10, 13:
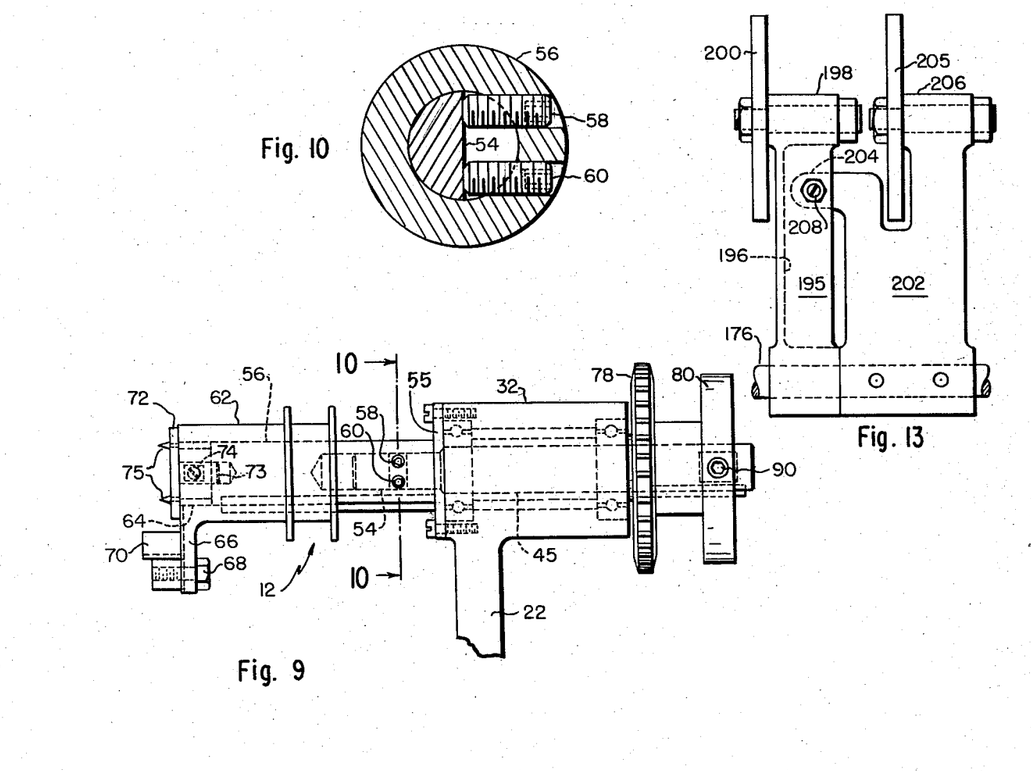
Fig. 9 is an enlarged elevation showing a part of one of the carriers.
Fig. 10 is an enlarged section on the line 10—10 of Fig. 9.
Fig. 13 is a detail of the associated control arms.

Referring to Figs. 9 and 10, the shaft 45 is rotatably supported within the main bearings 32 and its inner end is reduced and cut away to provide a semi-cylindrical section defining a shoulder 54. A washer 55, secured to the inner end of the bearing 32, acts on the reduced part of the shaft 45 to hold it against inward axial movement. Telescopically disposed about the shoulder 54 is the bored end of a second shaft 56 which carries a pair of set screws 58 and 60 acting on the shoulder 54, the construction and arrangement of parts being such that by advancing one set screw and backing off the other, the angular position of the shaft 45 relative to the shaft 56 may be varied within close limits. The shaft 56 is keyed to and has a sliding fit within a sleeve 62, the outer end of which is formed with a spool or grooved flange 63. The inner end of the shaft 56 is reduced, as indicated at 64, and projects through the end of the sleeve 62 and a gauge holder 66 which is welded to the end of the sleeve. The free end of the gauge holder 66 is slotted to receive an adjusting screw 68 which carries a heel gauge 70 for a heel H to be scoured.

A disk 72 is provided with an axial stud 73 which projects into a bore in the reduced end 64 of the shaft 56 and is secured in fixed position by a set screw 74. The disk 72 also carries four inwardly projecting clutch pins or grippers 75 which cooperate with pad 50 and firmly holding a heel H as it travels from the loading station to the discharge station. With this construction and arrangement of parts the shaft 56 and associated parts are free to rotate, but this shaft and the parts carried thereby are held against axial movement, whereas the sleeve, gauge holder and associated parts are not only rotatable with shaft 56 but also may be axially moved outwardly so as to carry the gauge holder and gauge outwardly for the purposes hereinafter explained.

Figure 11:
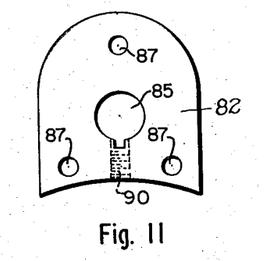
Fig. 11 is a plan view of the master gauge for setting the holders.
Figure 12:
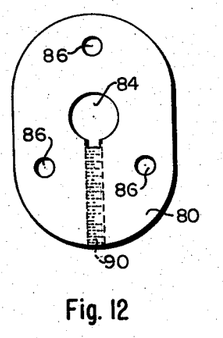
Fig. 12 is a plan view of the leader cam corresponding to the master gauge of Fig. 11.

Keyed to the outer end of the shaft 45 is a sprocket 78 and a leader cam 80, the sprocket 78, when engaged by the driving chain in the manner hereinafter explained, being operative to rotate the carrier through a predetermined angle. The leader cam 80 as above noted, is operative to govern the relative position of the carrier and sanding wheels and hence the surface of a heel to be scoured. Where the peripheral surface of a heel, except for its breast area, is to be scoured, the leader cam 80, shown in Fig. 12 is employed, but if the entire peripheral surface of the heel is to be scoured then the master gauge or cam 82 as shown in Fig. 11 is used in place of the leader cam 80.

For a finished heel of a given size the peripheral surface, other than the breast surface, are the same for both the master cam and leader cam, the former having a breast surface conforming to that of the finished heel to be produced, whereas the latter is formed with a protuberance or salient area at the breast surface. In either case both the leader cam 80 and the master gauge or cam 82 are formed with openings 84 and 85, respectively, each shaped to receive the keyed end portion of shaft 45, and matching openings 86 and 87 are provided to assure the use of the correct combination of parts. Set screws 90 may also be provided to lock the same on the respective shafts.

In using these parts the desired master cam 82 is first selected and after removing the disk 72 with its clutch pins 75 from the end of shaft 56, the master cam is applied so that its breast surface faces the gauge holder 70. The locking screw 68 is then loosened and a gauge holder 70 corresponding to the master gauge 82 is applied so that the corners of the master gauge snugly fit within the upturned wings of the gauge holder as shown by the broken line of Fig. 5, whereupon the locking screw 68 is tightened, the master gauge removed and the clutch disk 72 reapplied. The leader cam 80, corresponding to the master gauge 82, is then selected and applied to the outer end of the shaft 45 if all but the breast surface of the heel are to be scoured, otherwise the master gauge 82 is used in place of the leader cam 80.

Figure 7:
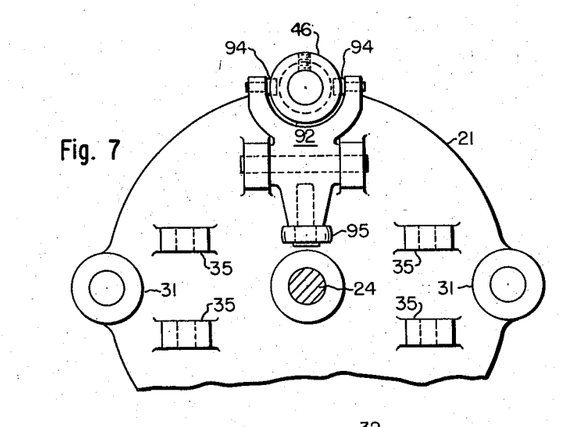
Fig. 7 is a section on the line 7—7 of Fig. 4, but with parts removed.

Referring to Figs. 4 and 7, in order to operate the clutches or grippers so as to receive and discharge heels at the proper period during the travel of the carriers, there is provided a rocker arm or cam follower 92 for each carrier, the rocker arm being pivotally mounted between the ears 35. The upper end of the arm 92 is forked and provided with inwardly directed studs 94 having rollers engaging the spool 46, and the lower end of the arm 92 carries a roller 95 engageable with a barrel cam 96 circumposed about the main shaft 24. The design of the cam is such that the follower arm 92 holds the heel clutch of gripper pad 50 in retracted position from the time the carrier approaches the discharge station until the carrier moves away from the loading station at which time the cam 96 permits the gripper pad 50 to move to advanced or gripping position under the influence of the spring 52 which position is maintained until the carrier 12 approaches the discharge station, when the cam 96 again operates to retract the gripper pad, thereby permitting a heel H to drop off into the discharge chute 18 or be ejected by the knock-out spring 98 (Fig. 5) carried by the platen 10 and positioned in the path of travel of a scoured heel held by the clutch pin 75.

Figure 5:
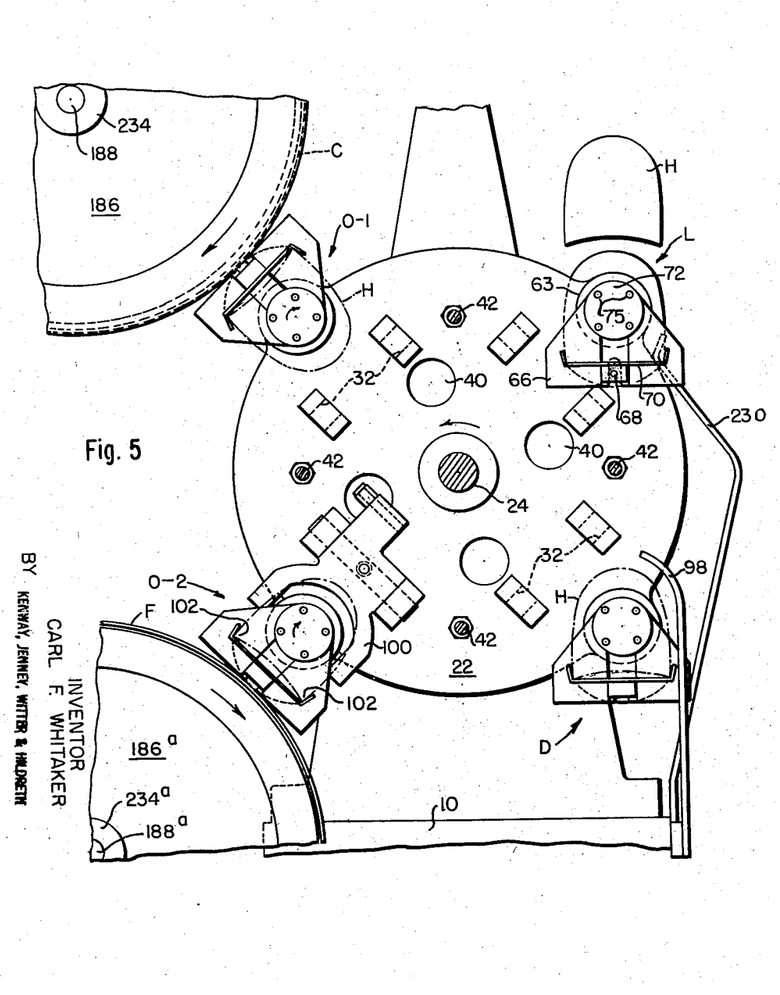
Fig. 5 is an enlarged section on the line 5—5 of Fig. 1.
Figure 6:
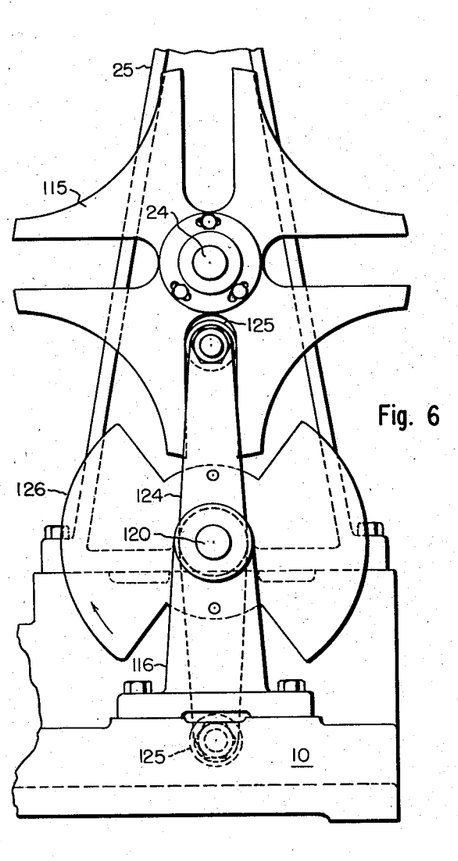
Fig. 6 is an enlarged view showing the Geneva drive for the carrier battery.
Figure 8:
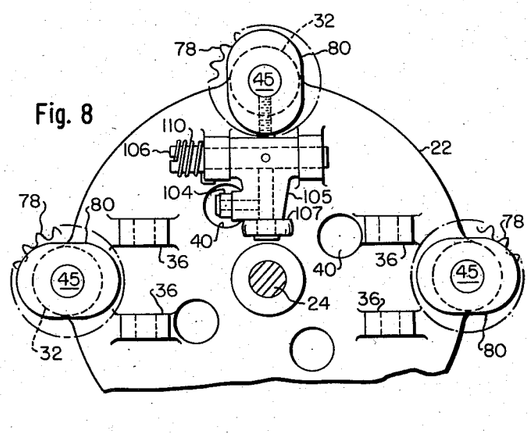
Fig. 8 is a section on the line 8—8 of Fig. 4, but with parts removed.

Referring to Figs. 4, 5 and 8, it is necessary, as will later be observed, to retract and maintain in retracted position the gauge support and holder 66—70 from the time the carrier approaches the first operating station until it leaves the discharge station. This is accomplished by providing a rocker arm 100, one for each carrier, that is pivotally supported by ears 38, the upper end of the arm being forked and carrying inwardly directed studs 102 having rollers projecting into the groove of spool 63. The lower end of the arm 100 is pivotally connected to a link 104 which extends through an adjacent opening 40. The link is pivotally connected to a cam follower arm 105, the upper end of which is pinned or otherwise fixed to a stud 106 pivotally mounted between the ears 36, and the lower end of the arm 105 carries a roller 107 engageable with a barrel cam 108 circumposed about the drive shaft 24. One end of the torsion spring 110 is anchored to the stud 106 and its outer end against one of the ears 36 so as to hold the roller 107 in engagement with cam 108. With this construction and arrangement of parts the ears 36, 38, rocker 100, link 104 and arm 105 provide a four-bar linkage system which, under the influence of the spring 110, is effective to hold the sleeve 62 and associated parts in advanced position prior to and during the period the carrier is at the loading station, but from the time the carrier leaves the loading station until it again approaches the loading station the cam 108, in opposition to the action of the spring 110, maintains the sleeve 62 and associated parts in retracted position.

*The carrier battery drive*

Each of the carriers 12 revolves about the shaft 24 and remains at the respective stations long enough to permit loading and the sanding operations to take place. It is therefore desirable to rotate the drive 24 intermittently at a speed that will not only insure a smooth operation, but also permit a complete and efficient scouring of the heels during the dwell period. Referring to Figs. 1, 2, 4 and 6, the end of the shaft 24 projects beyond the bracket 25 and is keyed or otherwise secured to a Geneva wheel 115 having four radial slots spaced 90° apart. Rotatably mounted on aligned bearings 116 and 118 (Fig. 1) attached to the platen 10 is a shaft 120, the outer end of which projects beyond the bearing 116 and carries a double sprocket 122 (shown in phantom in Fig. 2).

Figure 2:
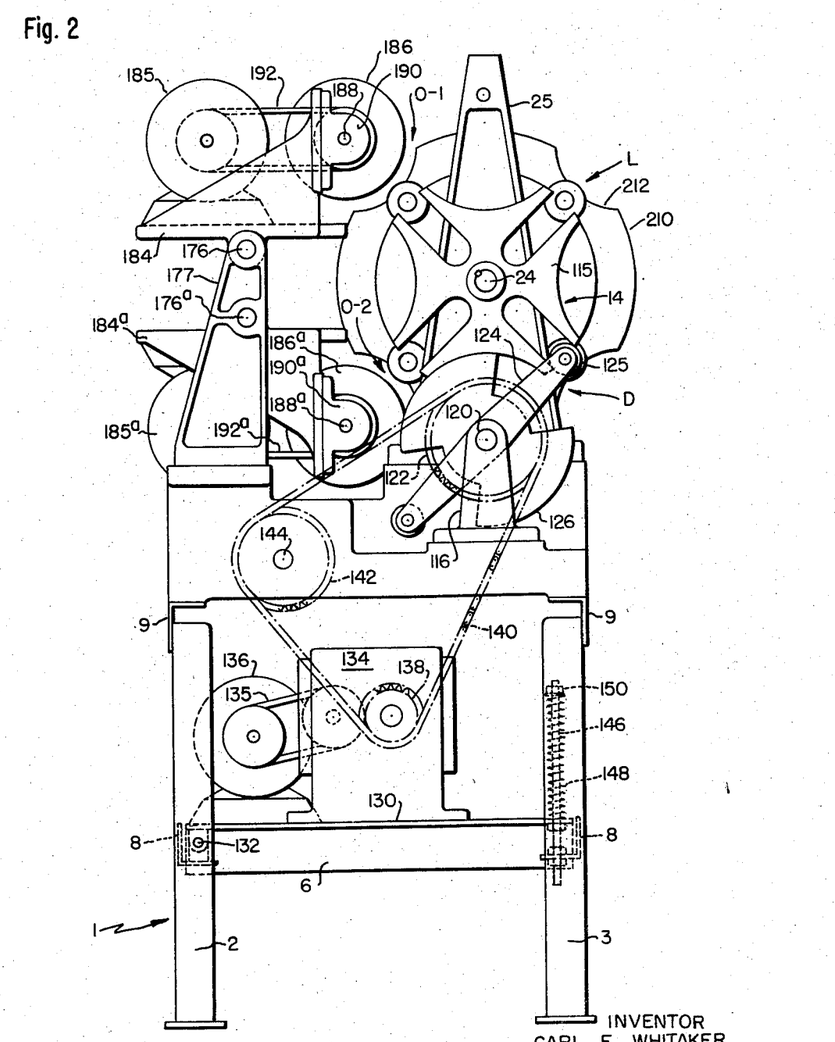
Fig. 2 is an enlarged elevation viewed from one end with parts removed for greater clarity, the drive being shown in phantom.

Inwardly of bearing 116 is a double driving arm 124 keyed to shaft 120, the opposite ends of the arm carrying offset rollers 125 which fit the slots of the Geneva wheel, and inwardly of the arm 124 and in vertical alignment with the Geneva wheel is a Geneva lock 126. The construction and arrangement of parts are such that rotation of the shaft 120 swings one end of the arm 124 into one of the slots of the Geneva wheel, as shown in Fig. 2, to rotate the latter through an angle of 90°, and during this movement a sector of the locking wheel 126 comes into operation to lock the Geneva wheel at the 90° dwell or rest position. The arm 124 continues its rotation for another 90° movement before its opposite end swings into the next slot of the Geneva wheel to cause the operation to be repeated, and the locking wheel 126 also continues to rotate but is so positioned that one of its sectors becomes effective to lock the Geneva wheel only when it is at rest. The double Geneva is thus effective to drive the carriage battery at the proper speed even though it is rotated at half the speed required for a single arm Geneva drive, and hence gives a much smoother operation than would otherwise be possible.

Figure 1:
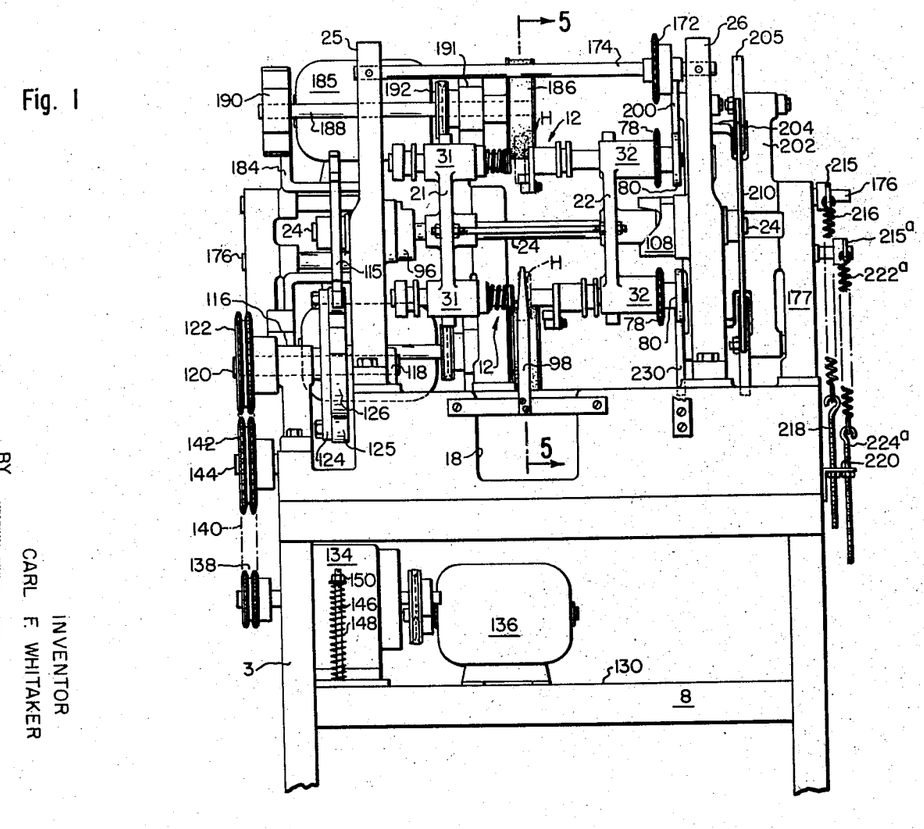
Fig. 1 is a front elevation of a machine constructed in accordance with the present invention.

Referring to Figs. 1 and 2, a shelf or plate 130 is pivotally connected, as indicated at 132 (Fig. 2), to the rear frame member 8 so as to swing upward and mounted on this plate is a reducing gear box 134 having an input shaft with a belt drive 135 connected with a fixed motor 136. The output shaft of the reducing gear box carries a double sprocket 138 connected by a double chain 140 with double sprocket 122 and a double sprocket 142 mounted on one end of a shaft 144 which extends along the rear of the machine beneath the station O–2.

The free edge of shelf 130 is provided with an opening registering with an opening in one of the frame members 8, and a threaded rod 146 extends through these openings, the lower end of the rod being secured to the frame member 8. A compression spring 148 is circumposed about the rod 146, its lower end acting against the shelf 130 and its upper end against an adjusting nut 150. The shelf is thus spring loaded to an extent which holds the chains 140 under normal tension sufficient to prevent slippage, but if the machine should jam or become overloaded, then the increased tension on the chains 140 causes the shelf 130 to swing upwardly an amount sufficient to permit slippage of the chain and consequent oscillation of the shelf which sets up a clatter providing an audible signal warning the operator to remedy the trouble.

*The rotary drive for the carriers*

As the carriers approach the operating station they are slowly rotated to a predetermined angle so that the peripheral surfaces of the heels held by the grippers are presented to the sanding wheels. For the usual heel scouring operation a rotation of 320° has been found satisfactory, although it is to be understood that a greater or lesser rotation may be had if desired or necessary, but in either case the rotary drive acts on the sprocket 78 (Fig. 9) carried by each carrier.

Figure 3:
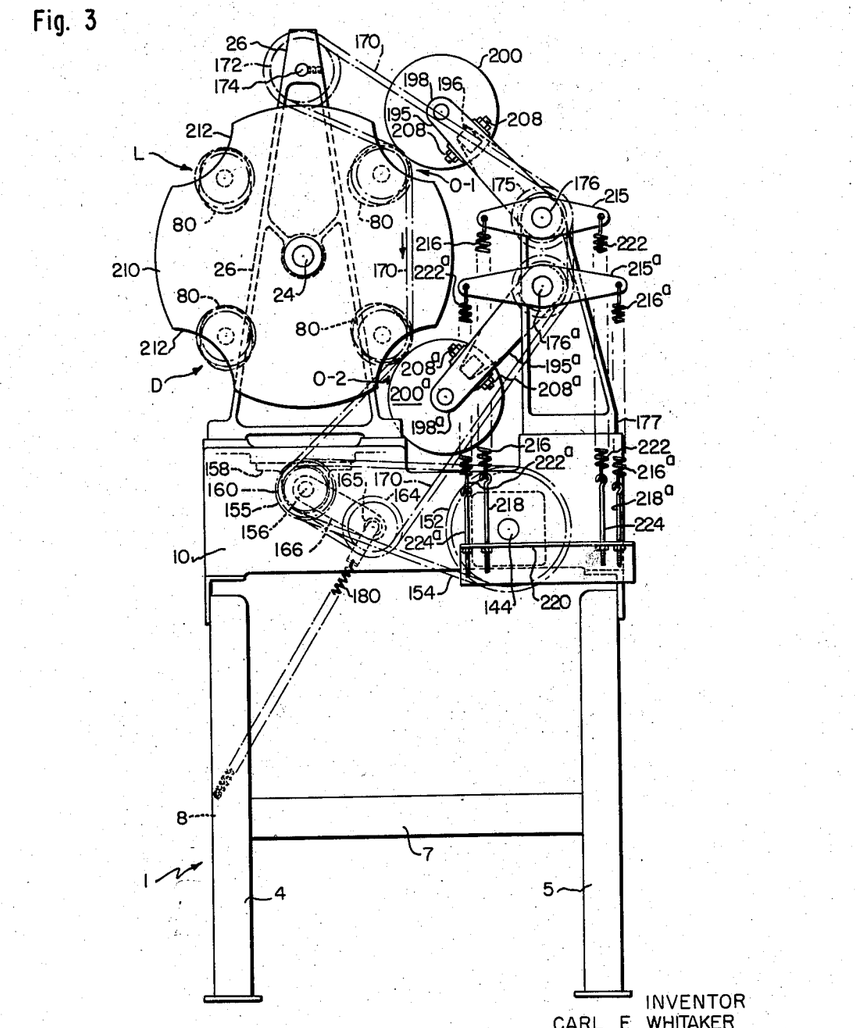
Fig. 3 is an enlarged elevation viewed from the opposite end.

Referring to Fig. 3, the drive shaft 144 carries a sprocket 152 connected by chain 154 with a sprocket 155 on shaft 156 journaled in bearings 158 beneath the carrier battery. A second sprocket 160 is fixed to shaft 156 and a floating sprocket 164 is mounted on a stud shaft 165 carried by floating arms 166 which are pivotally supported on shaft 156, the sprockets 160, 164 and 78 being in alignment. A chain 170 extends about the sprockets 160 and 164, upwardly into driving engagement with the sprockets 78 on the two carriers 12 which are either at, approaching or leaving the operating stations O-1 and O-2, then about a guide sprocket 172 mounted on a tie rod or shaft 174 secured to the bearing stands 25 and 26, then about a guide sprocket 175 mounted on a rocker shaft 176 journaled in an upstanding bracket 177, and finally back to sprocket 160.

With this construction and arrangement of parts the shaft 144 drives shaft 156 which in turn drives the floating shaft or takeup 165 and the drive sprocket 168 carried thereby. Since the run of chain 170 between the guide sprocket on shaft 156 and the guide sprocket 172 must be sufficiently flexible to permit revolution of the carriers about the shaft 24 without objectionable binding, and as the chain 170 must be held sufficiently taut to prevent slippage, there is provided a tension spring 180, one end of which is connected to the floating arms 166 and its other end to the adjacent frame member 8.

In operation each of the sprockets 78 is brought into driving engagement with chain 170 as the carrier revolves about the shaft 24 and approach the first operation station and as each of the carriers leaves the second operating station the sprocket 78 disengages the chain 170. From the time the carriers approach the first operating station until the time they leave the second operating station, they are being slowly rotated at a predetermined speed governed by the linear speed of the chain 170, which in turn is governed by the size of the driving sprocket 142. Hence, for a fixed speed of shaft 144, any desired linear speed of chain 170, within limits, may be obtained by selecting a sprocket 142 having the proper number of teeth; and the rate and degree of rotation of the carriers 12 may likewise be varied, within limits, by the selection of sprockets 78 and/or 142 having the proper number of teeth. It will be noted that both the heels H held by the grippers 50 and 75 and the leader cams 80 are also rotated synchronously so that the movement of the latter may be used to control the extent or area of sanding of the associated heel in the manner presently to be described.

*The first operating station and associated controls*

Referring to Figs. 1 to 3 and 13, a bracket 184 is keyed or otherwise fixed to one end of shaft 176 and mounted on this bracket is a motor 185 and a sanding wheel 186 axially adjustable on a shaft 188 which is mounted in bearings 190 and 191 secured to the upstanding wings of the bracket 184, the shaft being directly connected with the motor 185 by belt 192. The construction and arrangement of parts are such that the sanding wheel 186 is aligned with the heels held by the carriers and when the bracket 184 is tilted clockwise (Fig. 2) from retracted position the active surface of the sanding wheel is advanced to operating position in contact with the peripheral surface of a heel H, the "bite" or advance of the sanding wheel being governed by the angle through which the bracket 184 is tilted.

Adjacent to the opposite end of the shaft 176 there is freely mounted an arm 195 having a slotted portion 196 (Fig. 13). The free end of this arm carries a bearing 198 which supports a cam follower roll 200 of the same diameter as the associated sanding wheel, the roll 200 being disposed in vertical alignment with the leader cams 80 of the carriers so as to be successively engageable therewith when the carriers revolve about shaft 24. Alongside the arm 195 is a second arm 202 which is pinned or otherwise secured to the shaft 176, this arm being formed with a lateral offset 204 which projects into the slot 196. The free end portion of the arm 202 is recessed to receive a second follower roll 205 mounted in bearing 206. A pair of set screws 208 (Figs. 3 and 13) carried by the arm 195 above and below the slotted portion 196 engage the lateral offset 204 so as to lock the two arms in relatively fixed position. By loosening one of the set screws and advancing the other the angular position of one arm relative to the other may be adjusted so that the action of the leader cams 80 on the follower roll 200 and the consequent rotary movement of shaft 176 and tilting of the bracket 184 and parts carried thereby may be varied.

Referring to Figs. 1 to 3, there is mounted at the end of shaft 24 a plate cam 210 having four arcuate recesses 212 spaced 90° apart and defining four intervening throw portions, the plate cam being in vertical alignment with the second follower roll 205. The design and arrangement of these parts are such that when the carriers are at rest at the respective operating stations a segment of the follower roll 205 enters one of the recesses 212 and remains in out-of-contact relation with the walls of the recesses as long as the carrier is at rest, but when the carrier starts to revolve the salient portion of the leader cam 80 first acts on the follower roll 200 to rock the shaft 176 and arm 202 clockwise (Fig. 3), thus swinging the follower roll 205 out of the recess 212, and as the plate cam 210 rotates simultaneously with the revolution of carriers 12, the throw portions are presented to and engage the follower roll 205 which holds the shaft 176 in retracted position until the roll 205 drops into the next recess 212 as the next carrier approaches the first operating station.

Since the peripheral speed of the carrier is slightly greater than the linear speed of the chain 170, there is a slight reverse movement (counterclockwise in Fig. 3) of the carrier approximating 45° which is merely sufficient to insure that the salient portion of the leader cam 80 will first be presented to the roll 200, rather than one of the side faces of the cam. When the carrier comes to rest, chain 170 then operates to rotate the carrier in a clockwise direction (Fig. 3) and as the salient portion of leader cam 80 has been presented to and engaged by the roll 200 the shaft 176 and associated parts are held in retracted position, but as the heel and leader cam 80 continue their rotation the roll 200 engages the periphery of the leader cam, thus permitting the shaft 176 to rock from retracted position to advanced position. Since the rocking movement of the shaft 176 from one position to the other is accompanied by a corresponding movement of the bracket 184, the sanding wheel 186 is brought into operative position to scour the peripheral area of a heel H in the carrier 12 at the first operating station.

Since each carrier is rotated approximately 320° in the period between the time it reaches and departs from the operating station the leader cam acts first to permit the advance of the sanding wheel 186 to operative position and then retract it, after which the cam plate 210 comes into operation to hold the parts in retracted position until the start of the next operating cycle. The movement of the parts from retracted to advance position is accomplished by spring loading the shaft 176 and to this end there is fixed to the shaft 176 a rocker arm 215 (Figs. 1 and 3). One end of the relatively heavy tension spring 216 is secured to the inner end of the arm 215 and the other end of this spring is attached to an adjusting screw 218 acting on a bracket 220 on the frame of the machine. Opposing the action of the spring 216 is a relatively light tension spring 222 (Fig. 3) the upper end of which is secured to the outer end of the rocker arm 215 and its lower end is attached to an adjusting screw 224 which likewise acts on the bracket 220. Proper adjustment of the screws 218 and 224 not only causes the spring 216 normally to urge the shaft 176 counterclockwise (Fig. 3), but insures a shock-free movement of the parts due to the balancing action of the spring 222.

*The second operating station and associated controls*

The second operating station O-2 and associated controls are in all material particulars substantially the same as those of the first station and as the parts have merely been reversed similar reference characters have been applied thereto. As best shown in Figs. 2 and 3, the tilting bracket 184a is mounted on shaft 176a and swings counterclockwise (Fig. 3) in moving from retracted to advanced position, thus swinging the sanding wheel 186a (Fig. 2) upwardly into operative position, the rocking movement of the shaft 176 being accomplished by the action of the relatively heavy tension spring 216a secured to the outer ends of the rocker arm 215a.

As the carrier leaves the first operating station its clockwise rotation (Fig. 3) is arrested and as its linear speed is greater than that of the chain it undergoes a counterclockwise rotation of approximately 180° so that as it approaches the second station the salient portion of cam 80 is in position to be presented to the lower cam follower roll 200a. When the carrier reaches the second position counterclockwise rotation ceases and clockwise rotation commences since the chain 170 is continuously driven. The lower follower roll engaging the plate cam 210 holds the parts in retracted position until movement of the carrier ceases, whereupon the follower roll 200a takes over as above explained and under the influence of spring 216a the parts are moved to advanced position where the rough-sanded heel is subjected to a fine sanding wheel 186a. After having rotated through an angle of approximately 320° the peripheral surface of the heel (other than the breast surface) has been scoured and the carrier now starts its travel to the discharge station during which movement the sprocket 78 disengages from the chain 170.

The discharge station

Referring to Figs. 1, 4 and 5, it will be observed that the discharge station D is spaced 270° from the loading station and is positioned above the delivery chute 18. As the carrier approaches the discharge station the follower roll 95 of rocker arm 92 (Fig. 4) engages the throw of the barrel cam 96 and retracts the gripper 48 against the action of spring 52, and by the time the carrier has come to a complete stop the gripper 48 is fully retracted, thus permitting the scoured heel H to drop into chute 18. The throw of cam 96 is designed to hold the gripper retracted until after the carrier passes the loading station L and hence the grip on the heel H remains released as the carrier travels to the loading station.

If the scoured heel H fails to drop into the chute 18 due to the grip of the clutch pins 75, then when the carrier starts its travel back to the loading station L, the heel strikes the free end of the knockout spring finger 98 (Figs. 1 and 5) attached to a bracket secured to the platen 10, the free end of the spring finger 98 being tapered and curling inwardly so as to project into the space between the gripper 48 and the end of pins 75, thus assuring a positive action in knocking the heels off the pins into the chute 18. After passing the spring finger 98 the follower roll 107 of rocker arm 105 engages the dwell portion of barrel cam 108 thus permitting the torsion spring 110 to slide sleeve 62 and gauge 70 to advance or heel supporting position (Figs. 4 and 9).

When the cycle is completed it is necessary that the gauge 70 be properly positioned to receive an unscoured heel, i.e., the gauge 70 (Fig. 5) should be approximately horizontal, preferably having a slight inward inclination, and to this end there is provided a positioning arm 230 (Fig. 5), the lower end of which is attached to the platen 10 and the upper part being bent inwardly so that its resilient free end engages the outer side portion of the leader cam 80, thus holding the parts in proper position to receive a heel.

The sanding wheels

Figures 14, 16:
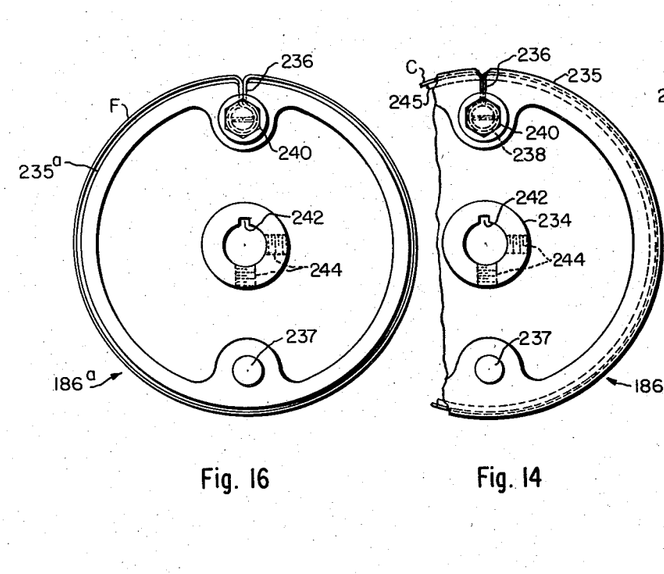
Fig. 14 is a fragmentary side elevation of a sanding wheel used for coarse scouring.
Fig. 16 is a side elevation of the sanding wheel used for fine scouring.
Figure 15:
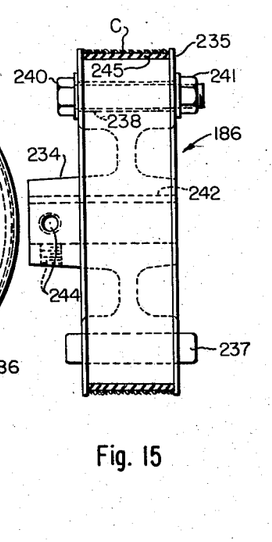
Fig. 15 is an end elevation of the sanding wheel shown in Fig. 14.
Figure 17:
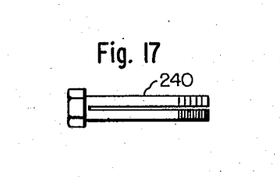
Fig. 17 is a side elevation of the locking screw carried by the sanding wheels.

Although the sanding wheels 186 and 186a may be of conventional design and construction, the use of the coarse sanding wheel 186 shown in Figs. 14 and 15 is highly advantageous. The wheel comprises a hub 234 integral with a flanged periphery 235 formed with an inwardly extending part having a radial slot 236 terminating in a transverse bore 238 which receives a split locking screw 240 (Fig. 17) carrying a nut 241. At a diametrically opposite position on the inner periphery of the wheel from the locking screw there is provided a balancing part 237 so that the wheel can be operated at high speeds without chattering or objectionable vibration. The hub 234 may be provided with a keyway 242 and set screws 244 so that it may be adjusted axially on the drive shaft 188.

The periphery of the wheel is preferably provided with a rubber or felt facing 245 or the like, but its width should be at least twice the thickness of the heels to be operated on so that only half or less of the circumferential surface of a strip of abrasive paper or tape C (Fig. 5) carried by the wheel is used. When such half is used then the wheel may be axially adjusted to present the other unused half before replacing the strip C. A particularly advantageous feature of this construction is the speed and the ease with which a fresh strip of abrasive tape may be applied, it being noted that it is merely necessary to remove screw 240 and the used strip and then pass the free ends of a fresh strip into the slot 236 and reapply the screw 240, then the screw is turned so as to draw the fresh strip C about the periphery with the desired degree of tension, after which the nut 241 is applied and tightened.

The fine sanding wheel 186a (Fig. 16) is the same as the wheel 186, except for the outer periphery, and the same reference characters are applied to the same part. In this construction the outer periphery 235a is free from flanges and the fine abrasive tape F is in out-of-contact relation to the outer periphery 235a except for those points at which it enters the slot 236. With this construction and arrangement of parts there is, in effect, an air cushion between the tape F and the periphery 235a which is highly advantageous in that it not only permits a more gentle scouring of the heels than would otherwise be possible, but also is effective to remove the burr-like formations at the edges of the peripheral surface due to the transverse flexing of the tape F.

Figure 18:
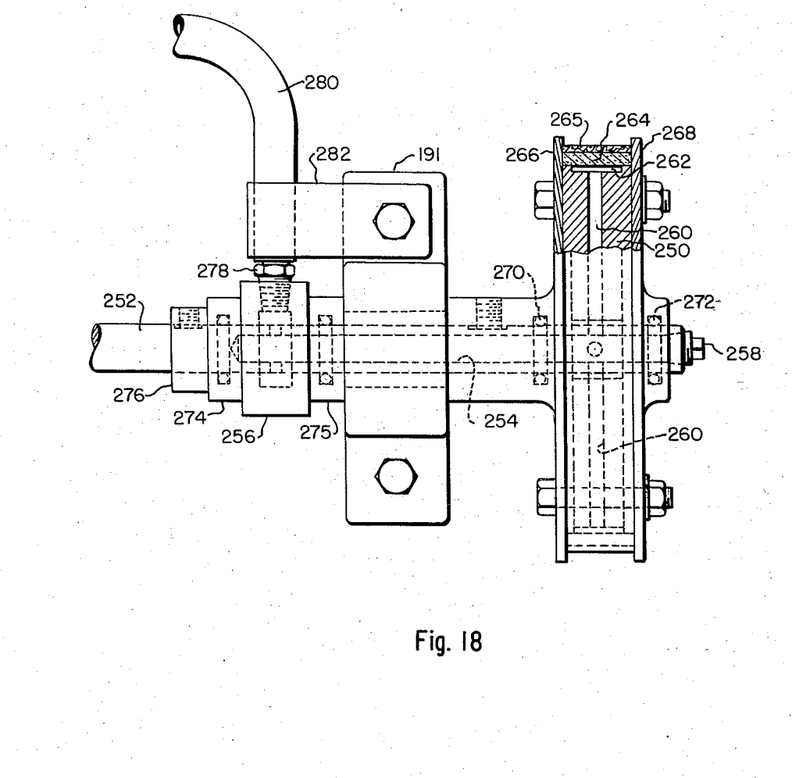
Fig. 18 is a side elevation of an inking wheel which may replace either sanding wheel.

The inking wheel

Where it is desired to apply ink or other treating fluid to the peripheral surface of a heel, an arrangement such as shown in Fig. 18 may be advantageously employed in place of the upper or lower sanding wheels. If, for example, it be desired to apply an ink or other coloring matter and then buff the colored surface, the inking roll of Fig. 18 would be used in place of the upper sanding wheel 186 and a buffer wheel would be used in place of the lower sanding wheel 186a.

The particular construction herein shown comprises a cylindrical plate 250 mounted on a shaft 252, the outer end portion of which is bored to provide a conduit 254 communicating with an ink supply coupling 256, the outer end of the conduit being closed by a screw plug 258. The plate 250 is provided with a plurality of radially extending passages 260 communicating with the shaft conduit 254 and a circumferential recess 262 which distributes the ink or other fluid to the inner side of a ring 264 of ink-pervious material such as sintered powdered metal or the like. Disposed about the ring 264 is a layer of felt 265 or the like fibrous material, and a pair of disks 266 and 268 are screwed to the plate 250, these plates being formed with hubs which carry sealing rings 270 and 272.

The hub of plate 266 is pinned or otherwise fixed to the shaft 252 which is freely rotatable in the bearing 191 (Fig. 1) and integral with the coupling 256 are sealing rings 274 and 275. A collar 276 pinned to the shaft 252 holds the parts against inward axial movement. The coupling 256 is provided with a nipple 278 connected with the end of a supply line 280 which is supported by a transverse bracket 282 secured to the bearing 191.

In operation the frictional contact between the layer 265 and periphery of the heel H is sufficient to rotate the inking wheel and the ink flowing through the line 280 into the bore 255 passes into the radial passages 260 and is distributed by gravity to the pervious ring 264 and fabric 265. After having applied the ink or other fluid to the periphery of the heel at the first operating station, the inked heel is then carried to the second operating station where it may be buffed by a wheel mounted on the shaft 188a in place of the fine standing wheel 186a. Thereafter the heel is carried to the discharge station where it is ejected as above described.

*Summary of operation*

Assuming that the proper gauges 70 and leader cams 80 have been applied and adjusted, the arms 195 and 202 have been properly set to secure the desired "bite," and that the motors for the two sanding wheels have been turned on, the main driving motor 136 is then turned on and the operator places an unscoured heel H into the gauge 70, as indicated in Fig. 9, then the drive mechanism advances the carrier 12 through an angle of 90° to the first operating station O–1. During the travel of the carrier to this station the barrel cam 96 first operates through arm 92 to cause the clutch spring 52 to move the clutch pad 50 into gripping relation with the clutch pins 75, thus firmly holding the heel until the carrier approaches the discharge station; the barrel cam 108 next acts through the link 104 to retract the gauge 70 and associated parts so that they are held out of position until just before the carrier comes to rest at the loading station; and at about this same time the sprocket 78 (Fig. 4) engages the chain 170 (Fig. 3). Since the linear speed of the carrier is somewhat greater than that of the chain, the carrier is rotated about 45° in a counterclockwise direction so that by the time it comes to rest at the first operating station the salient portion of the leader cam 80 is in position to be presented to the follower roll 200. During this period the roll 205 rides over one of the salient sections of the plate cam 210, thereby holding the shaft 176 and associated parts in retracted position, and by the time the cam and carrier come to rest the roll 205 has entered one of the recesses 212, thus transferring control of the rocking movements of shaft 176 to the roll 200 which moves inwardly a distance sufficient to contact the leader cam 80.

The chain 170 rotates the heel H and leader cam 80 which rocks the shaft 176 so that the sanding wheel 186 contacts the peripheral surface of the heel as it rotates. After having rotated through an angle of approximately 320°, the drive operates to swing the carrier to the second operating station O–2, and at the same time brings the second carrier which was loaded when the first carrier was at the first operating station.

In traveling from the first to the second operating station the sprocket 78 remains in engagement with the chain 170 and the carrier is rotated in a counterclockwise direction about 180° so as to present to the lower follower roll the salient portion of the leader cam 80. The identical sequence of operations takes place at the second operating station as at the first station, except that the shaft 176a and associated parts rock in the opposite direction. After the fine scouring operation at the second station has taken place the drive operates to swing the first carrier to the discharge station and simultaneously bring the second carrier to the second station and the third carrier to the first station.

As the carrier approaches the discharge station the sprocket 78 again rotates the carrier in a counterclockwise direction so that the rear curved surface of the scouring heel is uppermost, and at about this time the barrel cam 96 operates to retract the gripping pad 50 so that the scoured heel may drop into the chute 18. After the second and third heels have been operated on, the drive again revolves the carriers bringing the first carrier back to the loading station. In traveling from the discharge station the carrier first passes the knockout finger 98 (Fig. 5) and if the heel has not dropped off, then the finger 98 forces it off. Just before reaching the loading station the barrel cam 108 operates to restore the gauge to heel-receiving position and the positioning arm 230 engages the outer side of the leader cam 80 so that when the carrier comes to rest the parts are in position to receive another heel.

It will be observed from the foregoing that various types of operations other than scouring, coloring and/or buffing may be performed, depending upon the particular operating instrumentality. For example, formed wood and leather heels, and the like irregular shapes, may be made by substituting formed cutters for the sanding wheels; and if desired various types of waxing and polishing operations may be performed by making appropriate changes in the wheels.

It is to be understood that this disclosure is for the purpose of illustration and that various changes, modifications and substitutions may be made without departing from the spirit and scope of the invention as set forth in the appended claims.

I claim:

1. In a machine of the class described, a loading station, an operating station having an instrumentality for operating on the surface of an article, a carrier supported so as to move from said loading station to said operating station and back to said loading station, said carrier comprising a pair of spaced members movable to and from the loading and operating stations, a pair of axially aligned shafts rotatably supported by said members adjacent to their opposite ends for relative movement toward and away from each other, the adjacent ends of said shafts having clamping means for releasably holding an article to be operated on, means urging one of said shafts toward the other so as to bring said clamping means into operative position, means for moving one of said shafts away from the other so as to release said clamping means, driving means for intermittently moving said members to and from the operating station, and means operative only when said carrier is at the operating station for rotating one of said shafts.

2. In a machine of the class described, a loading station, an operating station having an instrumentality for operating on the surface of an article, a carrier supported so as to move from said loading station to said operating station and back to said loading station, said carrier comprising a pair of axially aligned shafts rotatably supported adjacent to their opposite ends for relative movement toward and away from each other, the adjacent ends of said shafts having clamping means for releasably holding an article to be operated on, means urging one of said shafts toward the other so as to bring said clamping means into operative position, means for moving the latter shaft away from the other so as to release said clamping means, said other shaft having two parts in telescopic relation, the inner part having a flat and the outer part having spaced radailly offset screws engaging said flat so as to lock the first part in fixed angular relation to said other part, driving means carried by said other shaft, and means at said operating station for effecting the rotation of said driving means so that an article held by said clamping means is rotated when at said operating station.

3. In a machine of the class described, a loading station, an operating station having an instrumentality for operating on the surface of an article, a carrier supported so as to move from said loading station to said operating station and back to said loading station, said carrier comprising a pair of axially aligned shafts rotatably supported adjacent to their opposite ends for relative movement toward and away from each other, the adjacent ends of said shafts having clamping means for releasably holding an article to be operated on, means urging one of said shafts toward the other so as to bring said clamping means into operative position, means for moving one of said shafts away from the other so as to release said clamping means, a gauge slidably mounted on one of said adjacent ends for properly positioning said article in said clamping means, means for moving said gauge from operative position to retracted position, driving means for rotating one of said shafts, and means at said operating station for effecting the rotation of said driving means so that an article held by said clamping means is rotated when at said operating station.

4. A machine of the class described comprising a drive shaft, spaced aligned members fixed to said drive shaft, a carrier mounted on said members so that upon rotation of said drive shaft said carrier travels from a loading station to an operating station and back to said loading station, said carrier having aligned shafts rotatably mounted for relative axial movement toward and away from each other, the adjacent ends of said shafts having releasable gripping means for holding an article to be operated on, an operating instrumentality at said operating station mounted to move toward and away from an article held by said gripping means when said carrier is at said operating station, a cam follower connected with said operating instrumentality so as to move it from a retracted position to operating position, means for rotating one of said shafts when said carrier is at said operating station, and a cam fixed to said drive shaft, said cam being constructed and arranged to engage said follower so that rotation of said cam effects movement of said operating instrumentality from retracted position to an operating position, wherein it operates on an article carried by said gripping means, and then back to retracted position 5. A machine as set forth in claim 4, wherein said latter shaft is formed in two parts having interlocking means by which their angular position may be adjusted.

6. In a machine of the class described, an operating station, a rotary holder for an article to be operated on, means at said operating station for rotating said holder, a pivotal bracket at said operating station arranged to tip toward and away from said holder, an operating instrumentality mounted on said bracket, an arm connected with said bracket, a second arm pivotally mounted to tip about the same axis as said bracket, an adjustable interlocking connection between the first and second arms for controlling their relative angular positions, a cam carried by said rotary holder, and a follower carried by one of said arms so as to engage said cam when said holder is at said operating station, whereby the tipping movements of said bracket may be controlled.

7. In a machine of the class described, an operating station, a rotary holder for an article to be operated on, means at said operating station for rotating said holder, a rock shaft at said operating station, a bracket mounted on said rock shaft to tip toward and away from said holder, an operating instrumentality mounted on said bracket, a first arm fixed to said shaft so as to rock therewith, a second arm freely mounted on said shaft adjacent to the first arm, an adjustable interlocking connection between the first and second arms for controlling their relative angular positions, a cam carried by said rotary holder, and a follower carried by one of said arms so as to engage said cam when said holder is at said operating station whereby the tipping movements of said bracket may be controlled.

8. A machine of the class described comprising a pair of spaced members rotatable about a fixed axis, a plurality of carriers supported by said members in circumferentially spaced relation, each carrier having a rotatable and releasable holder for receiving an article to be operated on, means for intermittently rotating said members so that each carrier successively travels from a loading station to at least one operating station, then to a discharge station and back to said loading station, means operative as each carrier leaves said loading station for actuating said holder to grip an article received thereby, retractable means at said operating station for operating on the surface of an article carried by said holder, means holding the operating means in retracted position, a sprocket carried by each holder, a continuously driven chain having a run extending by said operating station and arranged so that as each carrier approaches said operating station the associated sprocket meshes with said chain to initiate and maintain a predetermined rotation of the holder while at said operating station and simultaneously advance said operating means to operating position, said sprocket disengaging said chain as said carrier is advanced toward said discharge station, and means at said discharge station for releasing said holder so that said article may be removed.

9. A machine of the class described comprising a carrier having a rotatable and releasable holder for receiving an article to be operated on, means for successively moving said carrier from a loading station to an operating station and then back to said loading station, means operative as said carrier leaves said loading station for actuating said holder to grip an article received thereby, means at said operating station for operating on the surface of an article carried by said holder, means at said operating station for engaging and rotating said holder through a predetermined angle and simultaneously presenting the surface of said article to the operating means, means operative after the carrier leaves said operating station for releasing said holder so that said article may be removed therefrom, and means at said loading station for engaging said holder and maintaining it in a position to receive another article.

References Cited in the file of this patent

UNITED STATES PATENTS

| Number | Name | Date |
|---|---|---|
| 291,451 | White | Jan. 1, 1884 |
| 339,361 | Beers | Apr. 6, 1886 |
| 395,160 | Marsh | Dec. 25, 1888 |
| 441,771 | Mansfield | Dec. 2, 1890 |
| 719,198 | Cyr | Jan. 27, 1903 |
| 763,315 | Nash | June 21, 1904 |
| 1,732,119 | Brown | Oct. 15, 1929 |
| 1,743,203 | Fowler | Jan. 14, 1930 |
| 1,825,442 | Chambon | Sept. 29, 1931 |
| 1,898,648 | Thorson | Feb. 21, 1933 |
| 1,911,531 | Roderwald | May 30, 1933 |
| 2,130,409 | Aulson | Sept. 20, 1938 |
| 2,146,774 | Snader | Feb. 14, 1939 |
| 2,353,480 | Morsilius | July 11, 1944 |
| 2,420,547 | Lovely | May 13, 1947 |
| 2,432,765 | Keller | Dec. 16, 1947 |
| 2,475,555 | Saalinger | July 5, 1949 |
| 2,649,668 | Zinn | Aug. 25, 1952 |
| 2,688,214 | Ogle | Sept. 7, 1954 |

FOREIGN PATENTS

| Number | Country | Date |
|---|---|---|
| 57,557 | France | Nov. 19, 1952 |
| | (Addition to No. 996,626) | |